(12) United States Patent
Tam

(10) Patent No.: US 6,980,352 B1
(45) Date of Patent: Dec. 27, 2005

(54) ENCAPSULATED BICHROMAL GYRICON DISPLAY

(75) Inventor: Man-Chung Tam, Mississauga (CA)

(73) Assignee: Xerox Corporation, Stamford, CT (US)

( * ) Notice: Subject to any disclaimer, the term of this patent is extended or adjusted under 35 U.S.C. 154(b) by 16 days.

(21) Appl. No.: 10/886,147

(22) Filed: Jul. 7, 2004

(51) Int. Cl.[7] .............................................. G02B 26/00
(52) U.S. Cl. ..................................................... 359/296
(58) Field of Search ....................................... 359/296

(56) References Cited

U.S. PATENT DOCUMENTS

| | | |
|---|---|---|
| 4,126,854 A | 11/1978 | Sheridon |
| 5,262,098 A | 11/1993 | Crowley et al. |
| 5,344,594 A | 9/1994 | Sheridon |
| 5,604,027 A | 2/1997 | Sheridon |
| 5,708,525 A | 1/1998 | Sheridon |
| 5,717,514 A | 2/1998 | Sheridon |
| 5,739,801 A | 4/1998 | Sheridon |
| 5,754,332 A | 5/1998 | Crowley |
| 5,815,306 A | 9/1998 | Sheridon et al. |
| 5,825,529 A | 10/1998 | Crowley |
| 5,900,192 A | 5/1999 | Richley |
| 5,976,428 A | 11/1999 | Richley |
| 5,989,629 A * | 11/1999 | Sacripante et al. ......... 427/180 |
| 6,054,071 A | 4/2000 | Mikkelsen, Jr. |
| 6,235,395 B1 | 5/2001 | Sacripante et al. |
| 6,419,982 B2 | 7/2002 | Sacripante et al. |
| 6,445,490 B1 | 9/2002 | Chopra et al. |
| 6,703,074 B2 | 3/2004 | Sacripante et al. |
| 2004/0226820 A1 * | 11/2004 | Webber et al. ............... 204/471 |

OTHER PUBLICATIONS

Sheridon et al., *The Gyricon—A twisting ball display*, Proc. SID, Boston, MA 289, 1977.
T. Pham et al., *Electro-optical characteristics of the Gyricon display*, SID '02 Digest, 199, 2002.

* cited by examiner

Primary Examiner—Scott J. Sugarman
Assistant Examiner—Richard Hanig
(74) Attorney, Agent, or Firm—Eugene O. Palazzo; Fay, Sharpe, Fagan, Minnich & McKee, LLP

(57) ABSTRACT

Various layered arrays utilizing encapsulated bichromal balls are disclosed that can be used in display applications. Also disclosed are related methods for manufacturing the layered arrays using adhesive layers, and forming displays. The methods are particularly well-suited for forming displays having one or more monolayer(s) of closely-packed encapsulated bichromal balls.

22 Claims, 3 Drawing Sheets

ENCAPSULATED BICHROMAL GYRICON DISPLAY

BACKGROUND

The present disclosure relates to displays based upon encapsulated bichromal balls and methods of manufacturing such displays. It finds particular application in conjunction with display technology, and "electric paper" and will be described with particular reference thereto. However, it is to be appreciated that the present exemplary embodiment is also amenable to other like applications.

Bichromal balls or beads as sometimes referred to in the art, are small spherical balls which have an optical and an electrical anisotropy. These characteristics generally result from each hemisphere surface having a different color and electrical charge.

These spherical particles are imbedded in a solid substrate and a slight space between each ball and the substrate is filled with an oil so that the balls are free to rotate, and migrate in an oil-filled cavity, in a changing electrical field. If one hemisphere is black and the other is white, each pixel can be turned on and off by the electrical field applied to that location. Each pixel can be individually addressed, and a full page image can thus be generated.

Numerous patents describe bichromal balls, their manufacture, incorporation in display systems or substrates, and related uses and applications. Exemplary patents include, but are not limited to: U.S. Pat. Nos. 5,262,098; 5,344,594; 5,604,027 reissued as Re 37,085; 5,708,525; 5,717,514; 5,739,801; 5,754,332; 5,815,306; 5,900,192; 5,976,428; 6,054,071; 5,989,629; 6,235,395; 6,419,982; 6,235,395; 6,419,982; 6,445,490; and 6,703,074; all of which are hereby incorporated by reference. In addition, disclosure is provided by U.S. Pat. Nos. 4,126,854; and 5,825,529; and N. K. Sheridon et al., "The Gyricon—A twisting ball display", Proc. SID, Boston, Mass., 289, 1977; T. Pham et al., "Electro-optical characteristics of the Gyricon display", SID '02 Digest, 199, 2002; all of which are hereby incorporated by reference.

Gyricon display technology is currently being developed for commercial signage application. The Gyricon display devices are often produced by the "swollen sheet" method. In this method, the Gyricon display sheets are made by mixing or dispersing bare bichromal balls, which are approximately 75 $\mu$m to 150 $\mu$m in diameter, into an uncured silicone elastomer to yield a viscous paste. The elastomeric gel is then spread into a thin layer by a doctor blade on a supporting substrate and cured to form a solid flexible sheet. The sheet is then soaked in a dielectric oil that causes the elastomer to swell and form an oil-filled cavity around each ball. The balls are free to rotate in each swollen cavity. The swollen sheets are sandwiched between substrates carrying arrays of addressing electrodes to form a display.

Fabrication of the Gyricon display sheet involves many complicated steps. The material into which the balls are disposed or embedded is largely limited to the class of elastomeric materials chosen for their large capacity to swell. This material is costly. To prevent the loss of dielectric oil, which would render the display inoperative, the display needs to be sealed. The produced Gyricon sheet is relatively thick, about 300 $\mu$m to about 700 $\mu$m, and includes a dispersion of bichromal balls of many layers. The disadvantage of the multi-layered structure is that it degrades the contrast, i.e. reflectance, degrades the resolution, increases the switching voltage, and increases the complexity and cost of the driver electronics of the display. These add to the complexity and cost of the resulting Gyricon display.

Additionally, U.S. Pat. No. 6,445,496, which is incorporated herein by reference in its entirety, describes a method of encapsulating the bichromal balls within an oil-filled capsule. The capsule is formed by chemical means. Encapsulation of the Gyricon beads may eliminate the need for a costly elastomer and the sealing steps.

Furthermore, U.S. Pat. No. 6,492,025, incorporated herein by reference in its entirety, describes an example of microcapsule composition. U.S. Pat. No. 6,488,870, also incorporated herein by reference in its entirety, describes examples of additional encapsulation processes.

Monolayers of encapsulated bichromal balls can also be produced. The balls are generally randomly dispersed within the resin. However, such randomly dispersed balls are not closely-packed and produce a large amount of open space. This results in decreased optical contrast.

Accordingly, there is a need for a display member of one or more monolayers of closely-packed bichromal balls, and a technique for producing such a display member.

BRIEF DESCRIPTION

The present disclosure relates to methods and compositions for producing a closely-packed bichromal Gyricon display. The resulting Gyricon display exhibits enhanced optical characteristics.

In accordance with one aspect of the present exemplary embodiment, a display member is provided comprising a substrate, a layer of an adhesive on the substrate, and a monolayer of encapsulated bichromal balls disposed within the adhesive on the substrate. Preferably, the monolayer of encapsulated bichromal balls is applied to the adhesive by a cascading application process. This results in improved uniformity and close-packing of the coated monolayer, critical factors for achieving maximum optical performance of a display member.

In accordance with yet another aspect of the present exemplary embodiment, a process for forming a layered array having a monolayer of encapsulated bichromal balls is provided. The process comprises providing a substrate having an exposed adhesive surface. The process also comprises a step of depositing, such as by a cascading application process, a plurality of encapsulated bichromal balls on the exposed adhesive surface of the substrate such that a monolayer of closely-packed encapsulated bichromal balls is formed whereby each of the encapsulated bichromal balls of the resulting monolayer contacts the exposed adhesive face of the substrate and is thereby retained on the substrate.

In another aspect of the present exemplary embodiment, a display assembly is provided comprising a supporting substrate, a first addressing electrode disposed on the supporting substrate, a first adhesive layer disposed on the first electrode, a first monolayer of encapsulated bichromal balls disposed within the adhesive on the first adhesive layer, a second monolayer of bichromal balls disposed on the first monolayer of bichromal balls, a second adhesive layer disposed on the second monolayer of bichromal balls, a second addressing electrode disposed on the second adhesive layer, and a protective cover disposed on the second electrode and generally encapsulating the resulting assembly. The encapsulated bichromal balls are applied through the use of a cascading application process to produce layer(s) of closely-packed bichromal balls.

The transmission optical contrasts obtained by the monolayer(s) of the closely-packed bichromal balls produced by the processes disclosed herein are from about 0.40 to about 0.70. This allows only from about 20% to about 40% of incident light to transmit through the monolayer(s). Preferably, only less than 30% of incident light is allowed to transmit. Displays produced utilizing such closely-packed bichromal balls exhibit enhanced optical contrast, among other characteristics.

These and other non-limiting aspects and/or objects of the exemplary embodiment of the present disclosure are more particularly described below.

BRIEF DESCRIPTION OF THE DRAWINGS

The following is a brief description of the drawings, which are presented for the purposes of illustrating the development disclosed herein and not for the purposes of limiting the same.

DETAILED DESCRIPTION

Figure 1:
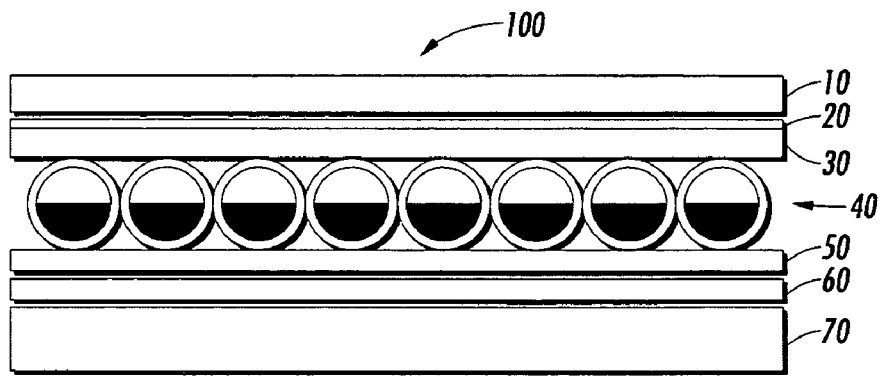
FIG. 1 is a schematic cross-sectional diagram of a display member having a monolayered structure in accordance with one of the exemplary embodiments.

Recent work has shown the feasibility of encapsulating bichromal balls within an oil-filled gelatin-polyphosphate shell by chemical means. The shell can be produced from a variety of materials such as those conventionally described and include gelatin/polyphosphate as well as gelatin/gum arabic. Encapsulation eliminates the need for the costly elastomer and the swelling step. Also, there is no need to form a seal to prevent the loss of oil.

The present exemplary embodiment provides an improved display member utilizing a monolayer of closely-packed encapsulated bichromal balls. The embodiment also provides an improved display member exhibiting some of the optical and tactile properties of paper. Furthermore, the embodiment provides an improved display including two or more layers of bichromal balls. The embodiment also provides a manufacturing process of fabricating the improved display members. The manufacturing process is applicable for making display members having planar and non-planar surfaces.

The monolayer structure of the exemplary display members in accordance with the present discovery has the advantage of a smaller thickness which reduces the switching voltage and improves resolution, results in higher contrast, provides for a simplified manufacturing process and lower cost. The discovery also finds application in electrical paper.

In this regard, when Gyricon displays are prepared from bichromal balls arranged in a monolayer, it is important that the balls are packed as closely to each other as possible. Otherwise the optical contrast will be degraded.

The packing efficiency can be assessed by coating a monolayer of bichromal balls on an adhesive transparent substrate such as polyester and measuring the transmission optical contrast density. Transmission optical density can be experimentally measured by a commercially available densitometer such as Model TR927 made by GretagMacbeth.

Transmission optical density DT is represented by the formula:

$$D_T = \log_{10}(I_0/I) \text{ where } I \text{ is the transmitted light intensity and } I_0 \text{ is the incident light intensity.}$$

Transmission optical contrast density is given by the difference between the optical densities of the monolayer of bichromal balls coated on the polyester substrate and that of the polyester substrate alone.

The transmission optical contrast density obtained by coating a monolayer of bichromal balls on an adhesive polyester substrate in accordance with the present disclosure is in the range of 0.40–0.70, allowing only 20–40% of incident light to transmit through the monolayer. Preferably, only less than 30% of incident light is allowed to transmit.

For bichromal balls encapsulated inside capsules, the amount of light that can transmit through the monolayer is preferably less than 40%.

The various display members comprising closely-packed monolayers described herein generally comprise a supporting substrate or paper on which is disposed a layer of an adhesive. Typically, an addressing electrode is disposed between the adhesive layer and the supporting substrate. Disposed on the first adhesive layer are one or more layers of encapsulated bichromal balls. For layered arrays, a second adhesive layer is disposed on the one or more layers of bichromal balls such that the bichromal balls are positioned between the two adhesive layers. In another embodiment, a monolayer of bichromal balls is produced and then joined face-to-face. Disposed adjacent to the second adhesive layer, and on a side of that layer opposite the layers of bichromal balls, is a second addressing electrode. And, a protective cover or layer is positioned along the exposed second addressing electrode. Details of each of these components are as follows.

The supporting substrate can be either electrically conductive or insulative. The substrate can be opaque, semi-transparent or transparent. In addition, the substrate can comprise an insulative layer with an electrically conductive coating such as vacuum-deposited aluminized or titanized polyester. The substrate can have any thickness typically in the range of from about 25 to about 2000 microns depending on the end-use application.

The commonly used supporting substrate includes indium tin oxide coated on glass or on polyester. Both are commercially available. Also potentially included are printed circuit boards.

More specifically, the substrate can be either electrically conductive or electrically insulating. When conductive, the substrate can be opaque, translucent, semitransparent, or transparent, and can be of any suitable conductive material, including, but not limited to, copper, brass, nickel, zinc, chromium, stainless steel, conductive plastics and rubbers, aluminum, semitransparent aluminum, steel, cadmium, silver, gold, indium, tin, metal oxides, including tin oxide and indium tin oxide, and the like. For electric paper applications, the paper can be rendered conductive by the inclusion of a suitable material therein or through conditioning in a humid atmosphere to ensure the presence of sufficient water content to render the material conductive. When insulative, the substrate can be opaque, translucent, semitransparent, or transparent, and can be of any suitable insulative material, such as paper, glass, plastic, polyesters such as Mylar® (available from Du Pont) or Melinex® 442, (available from ICI Americas, Inc.), and the like. In addition, the substrate can comprise an insulative layer with a conductive coating, such as vacuum-deposited metallized plastic, such as titanized or aluminized Mylar® polyester, wherein the metallized surface is in contact with the adhesive layer or any other layer situated between the supporting substrate and the adhesive layer. The substrate has any effective thickness, typically from about 25 microns to about 1000 microns, and preferably from about 50 microns to about 200 microns, as previously noted, although the thickness can be outside of this range.

The addressing electrode is electrically conductive and can include any suitable conductive material such as aluminum, copper etc. It can be a thin semi-transparent conductive coating on the substrate such as aluminized polyester. It will be appreciated that in most display applications, the bichromal balls are individually addressable by the electrodes.

Indium tin oxide (ITO) is probably the most commonly used electrode material for display. The conductive electrode can be a continuous layer or a discontinuous island structure.

A more complete understanding of the processes and apparatuses disclosed herein can be obtained by reference to the accompanying drawings. These figures are merely schematic representations based on convenience and the ease of demonstrating one or more exemplary embodiments of the present development, and are, therefore, not intended to indicate relative size and dimensions of the devices and/or assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to component of like function.

Referring to FIG. 1, an exemplary embodiment array 100 comprises a protective layer 10, a first addressing electrode 20, a first adhesive layer 30, a layer of bichromal balls 40, a second adhesive layer 50, a second addressing electrode 60, and a supporting substrate 70.

Figure 2:
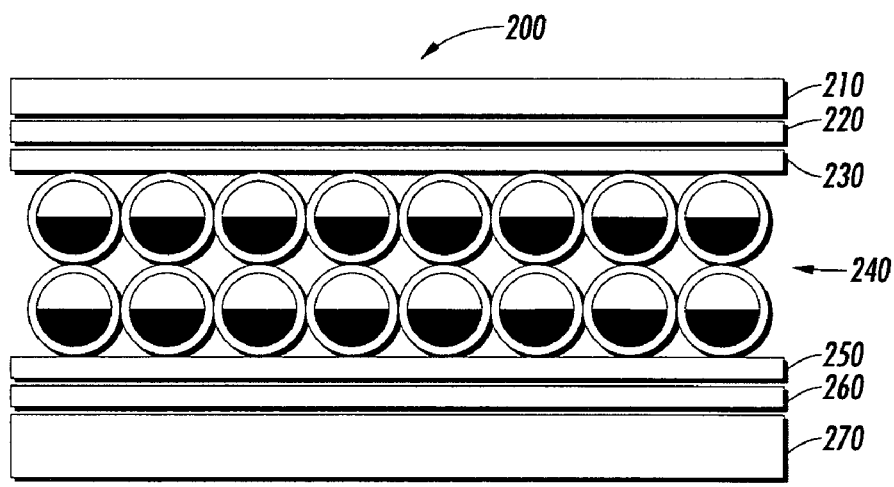
FIG. 2 shows a schematic cross section of another display member having a dual-layered structure in accordance with another of the exemplary embodiments.

In accordance with another aspect of the present discovery, another exemplary embodiment array 200 is provided as shown in FIG. 2. The array 200 comprises a protective cover 210, a first addressing electrode 220, an adhesive layer 230, and at least one layer of bichromal balls 240. The array 200 further comprises a second adhesive layer 250, a second addressing electrode 260, and a supporting substrate 270. Generally, the number of layers of bichromal balls will be one or two; however, the present discovery includes a greater number of layers.

Figure 3:
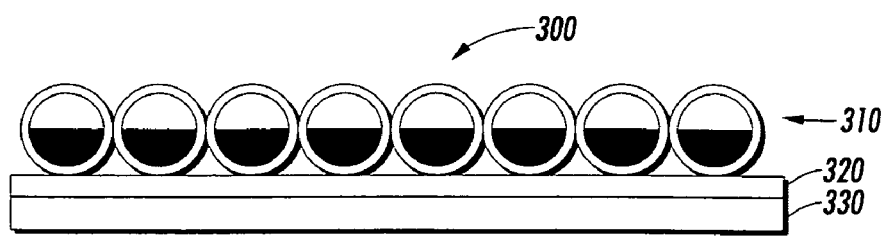
FIG. 3 illustrates schematically yet another display member having a monolayered structure and coated on a substrate in accordance with a further exemplary embodiment.

FIG. 3 illustrates another exemplary embodiment array 300 comprising a layer of bichromal balls 310 disposed on an adhesive layer 320 which is disposed on a layer of paper 330.

Specifically, the supporting substrate can be constructed by techniques already known in the art. The charge retaining islands can be created on or in an encapsulating layer by many means with any conductive material. One technique, which has been tested, creates islands of conductive and transparent indium tin oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester. An encapsulating layer of polyester patterned with ITO islands of 0.090" on an edge and 0.010" channels has been demonstrated. Extending the process to develop patterns with 0.003" to 0.005" channels and island edge dimensions of 0.015" to 0.025" is straight-forward. Still higher resolution can be achieved using other patterning processes and technologies well known in the art. Any metal, such as chrome or aluminum, applicable in thin films and patternable by lithographic processes could be used in place of the ITO. Many plastic materials, such as PVDC and polyethylene, are possible candidates for a substrate on which to build the islands.

Incorporation of an adhesive layer promotes the formation of the monolayered embodiments of the encapsulated bichromal balls in accordance with the present discovery. However, as noted, multiple adhesive layers can be used. The adhesive layer can include any suitable adhesive material. Typical adhesive materials include, but are not limited to, copolymers of styrene and acrylate, polyester resins, copolymers of acrylonitrile and vinylidene chloride, polyvinyl acetate, polyvinyl butyral, polyolefin, cyanacrylates, silicone and/or epoxy etc., and combinations thereof. The adhesive layer can have any thickness, however is typically in the range of from about 0.01 to about 20 microns, although the thickness can be outside of this range.

The adhesive layer usually is a separate layer of adhesive coating applied over the electroded substrate. For some applications such as electrical paper, the adhesive layer can also include an adhesive coating applied over the paper as exemplified in FIG. 3.

The bichromal balls form a closely-packed monolayer adhering to the adhesive layer. For signage applications, the capsules may have a diameter of about 120 microns ($\mu$m), and the capsules may be substantially uniform in size in order to optimize performance. For applications requiring higher resolution, a smaller diameter is preferred. Bichromal balls having a formulation of polywax/titania/pigment can be encapsulated within an oil-filled shell such as a shell formed from gelatin-polyphosphate by chemical means. The bichromal balls possess electrical dipoles or are anisotropically charged and they are free to rotate in response to an imaging electric field. Details of encapsulating bichromal balls by a gelatin-polyphosphate shell are included in U.S. Pat. Nos. 6,492,025 and 6,488,870, both of which are hereby incorporated by reference.

For display applications, the protective cover is transparent or semi-transparent. It can be either electrically conductive or insulative. It can comprise an insulative layer with an electrically conductive coating such as vacuum-deposited aluminized polyester. Its thickness is typically in the range of from about 25 to about 2000 microns depending on the particular application. The protective cover is usually the same as the supporting substrate, however for display applications, it should be transparent.

The monolayer of the various display members in accordance with the present discovery is generally formed by coating of the adhesive layer and then coating of the encapsulated bichromal balls over the adhesive layer.

The adhesive layer can be coated onto the electroded substrate or paper as in FIG. 3, by any suitable coating technique. Typical coating processes include, but are not limited to, extrusion using slot die, wire-wound rod coating, air-knife coating, gravure roll coating, dip coating, spray coating, draw-bar coating and the like.

Coating of the encapsulated bichromal balls can be accomplished by cascading them over the adhesive layer. Only the capsules that are in direct contact with the adhesive layer are coated, yielding a uniform coating. The capsules not in direct contact with the adhesive layer remain unattached and can be removed by a variety of means such as gravity, vacuum suction etc. Coating uniformity can further be improved by cascading the balls over the surface several times. Alternatively, uniformity can be enhanced utilizing vibratory motion, etc., to improve ball placement into voided areas.

Figure 4:
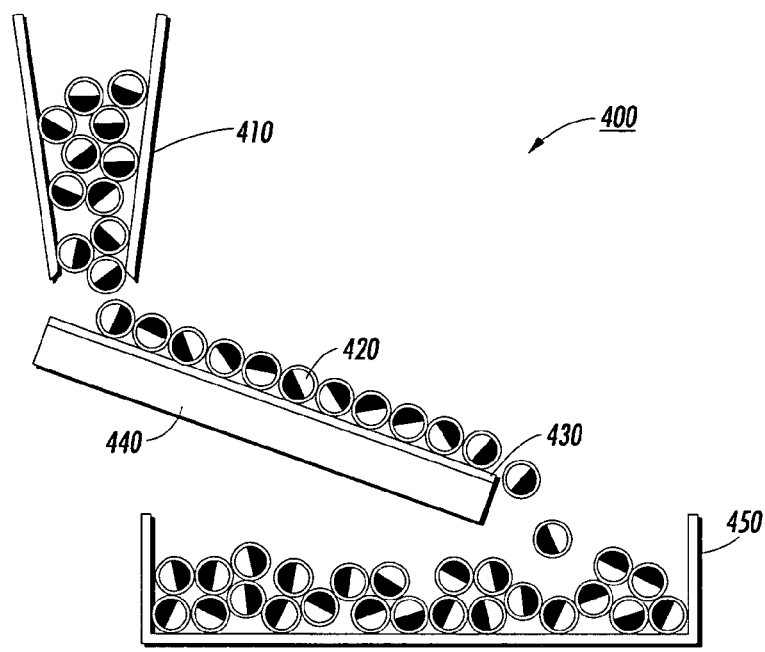
FIG. 4 shows schematically a coating process suitable for making a sheet or display member in accordance with one of the exemplary embodiments.

FIG. 4 illustrates an assembly 400 used in an exemplary embodiment process system, i.e., cascading application or fabricating process, according to the present discovery. The assembly 400 includes a metering hopper 410 positioned above an inclined surface 440 over which a plurality of bichromal capsules 420 are deposited. Disposed on the upwardly directed face of the substrate 440 is an adhesive layer 430. The adhesive layer 430 retains a portion of the bichromal capsules 420 deposited thereon. The excess portion of the bichromal capsules 420 cascade off the substrate 440 and into a tray or collection container 450.

Consequently, coating of the encapsulated bichromal balls can be accomplished by cascading them over the adhesive layer. Only the capsules that are in direct contact with the adhesive layer are coated, yielding a uniform coating. The capsules not in direct contact with the adhesive layer remain unattached and can be removed by a variety of means such as gravity, vacuum suction, etc. Coating uniformity can further be improved by cascading the capsules over the surface several times.

Figure 5:
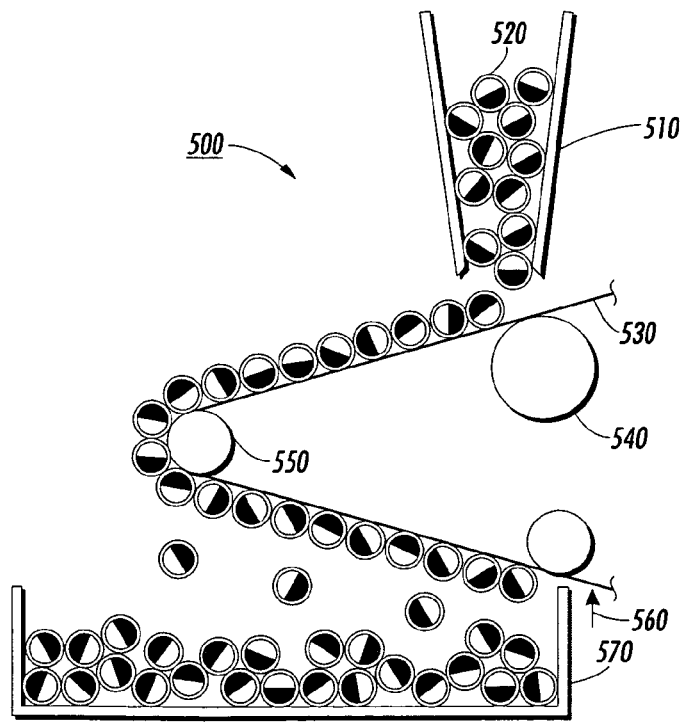
FIG. 5 illustrates schematically another coating process suitable for making a continuous roll of display member in accordance with a further embodiment.

FIG. 5 illustrates another system 500 for another exemplary embodiment system and process according to the present discovery. The system 500 includes a metering hopper 510 which retains a plurality of bichromal capsules 520. The metering hopper 510 controllably releases the bichromal capsules onto an adhesive layer of a moving substrate which is guided by rollers 540 and 550 to provide an appropriate angle of inclination. The adhesive layer retains a portion of the bichromal capsules 520 such that a single layer of bichromal capsules is deposited upon the face of an adhesive layer 530. The excess portion of the bichromal capsules are collected in a receiving tray or collection container 570.

Figure 6:
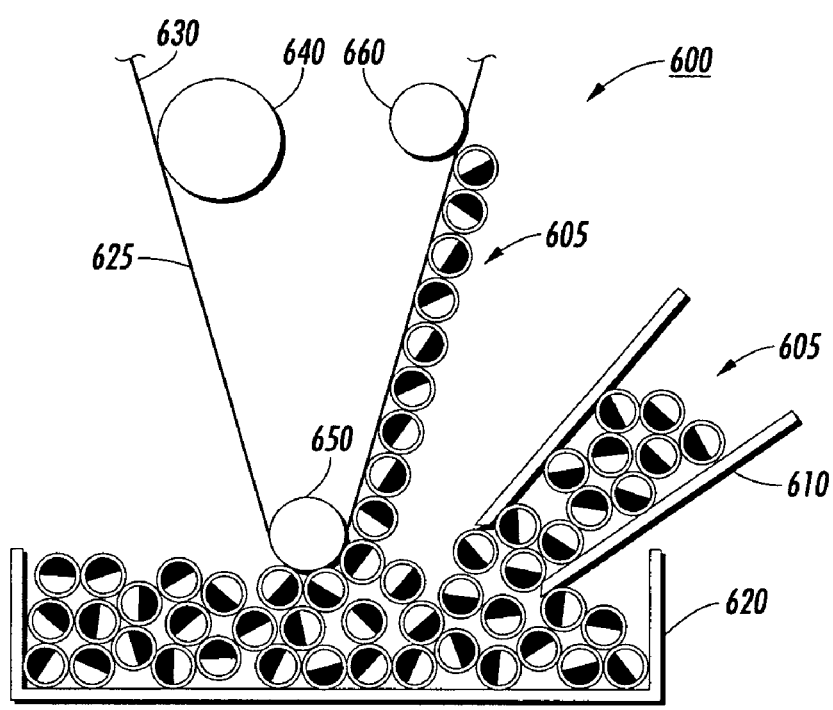
FIG. 6 shows schematically a further coating process for making a sheet or display member in accordance to another exemplary embodiment.

FIG. 6 shows a further system 600 for an additional exemplary embodiment system and process according to the disclosure. The system 600 includes a metering hopper 610 which delivers bichromal capsules 605 to an application container 620. The bichromal capsules are applied onto an adhesive layer 625 of a moving substrate 630 which is guided by rollers 640, 650 and 660 into the application container 620. The adhesive layer 625 retains a portion of the bichromal capsules605 such that a single layer of closely-packed bichromal capsules 605 are deposited upon the face of the adhesive layer 625. The excess portion of the bichromal capsules 605 are dropped off into application container 620. This results in the production of a monolayer of closely-packed bichromal capsules.

Various trials were conducted in which various layered arrays were formed in accordance with the present discovery.

An adhesive coating was applied to 100 $\mu$m thick aluminized polyester by spraying. Encapsulated bichromal Gyricon balls having two hemispheres, one red and one white, approximately 125 to 150 $\mu$m in diameter, were cascaded over the adhesive surface several times to yield a very uniform coating. Microscopic examination showed that the balls were closely-packed with respect to each other in a monolayer. A protective cover including a 100 $\mu$m thick layer of aluminized polyester was placed on top of the coated bichromal balls to form a sandwiched structure or layered array as shown schematically in FIG. 1.

Application of an electric field of one polarity caused the bichromal balls to orient preferentially in one direction (red). Reversing the polarity of the electric field caused the bichromal balls to orient in the opposite direction (white). The switching voltage threshold was observed to be about 80 volts.

In another trial, an adhesive coating was applied to 100 $\mu$m thick aluminized polyester by spraying. Encapsulated bichromal Gyricon balls having two hemispheres, one black and one white, approximately 125 to 150 $\mu$m in diameter, were cascaded over the adhesive surface several times to yield a very uniform coating. Microscopic examination showed that the balls were closely-packed with respect to each other in a monolayer. The produced sheet was cut in half. The sheets were then placed face-to-face with each other to form a dual-layered structure as shown schematically in FIG. 2.

Application of an electrical voltage, approximately 200 volts, of one polarity caused the bichromal balls to orient preferentially in one direction (black). Reversing the polarity of the electric field caused the bichromal balls to orient in the opposite direction (white). The produced display member showed excellent contrast of the image.

In an additional example, the release liner of an adhesive label, such as one produced commercially by Xerox was removed. The resulting sheet included an adhesive layer coated on white paper. Encapsulated bichromal Gyricon balls having two hemispheres, one red and one white, approximately 125 to 150 $\mu$m in diameter, were cascaded over the adhesive surface several times to yield a very uniform coating. A Gyricon display was made by sandwiching the coated paper between two pieces of conducting glass having indium tin oxide conductive coating as electrodes.

Application of an electrical voltage of about 200 volts of one polarity caused the bichromal balls to orient preferentially in one direction (red). Reversing the polarity of the electric field caused the bichromal balls to orient in the opposite direction (white).

The present discovery enables the production of a display having a monolayer of bichromal balls.

The monolayer structure of the display members in accordance with one of the exemplary embodiments provides the advantages of smaller thickness which reduces the switching voltage and improves resolution, increases contrast, enables a simplified manufacturing process and lower cost. The invention also enables the display to exhibit improved flexibility and have many of the characteristics associated with paper.

While the discovery has been described specifically using encapsulated (shelled) bichromal balls, other encapsulated materials such as encapsulated electrophoretic particles have been used to form displays including those described in U.S. Pat. No. 6,492,025, and those described in U.S. Pat. No. 5,961,804, both of which are hereby incorporated by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A display member comprising:
   a substrate;
   a layer of an adhesive disposed on said substrate; and
   a monolayer of closely-packed encapsulated bichromal balls disposed on said adhesive to produce a display member having a transmission optical density contrast of from about 0.40 to about 0.70.

2. The display member of claim 1, further comprising:
   an addressing electrode disposed between said substrate and said adhesive layer.

3. The display member of claim 1, further comprising:
   a first addressing electrode disposed between said substrate and said adhesive layer;
   a second layer of an adhesive disposed on and contacting said monolayer of encapsulated bichromal balls;
   a protective layer disposed on said second adhesive layer; and
   a second addressing electrode disposed between said second adhesive layer and said protective layer.

4. The display member of claim 1, wherein said substrate is electrically conductive and includes a material selected from the group consisting of copper, brass, nickel, zinc, chromium, stainless steel, conductive plastics, conductive rubbers, aluminum, semitransparent aluminum, steel, cadmium, silver, gold, indium, tin, metal oxides, and combinations thereof.

5. The display member of claim 1, wherein said substrate is electrically insulative and includes a material selected from the group consisting of paper, glass, plastics, and combinations thereof.

6. The display member of claim 1, wherein said adhesive is selected from the group consisting of copolymers of styrene and acrylate, polyester resins, copolymers of acrylonitrile and vinylidene chloride, polyvinyl acetate, polyvinyl butyral, polyolefins, cyanacrylates, silicone, epoxy and combinations thereof.

7. The display member of claim 1, wherein said substrate has a thickness of from about 25 microns to about 2000 microns.

8. The display member of claim 1, wherein said adhesive layer has a thickness in the range of from about 0.01 micron to about 20 microns.

9. The display member of claim 1, wherein said capsule of the encapsulated bichromal balls have a diameter of from about 30 microns to about 300 microns.

10. The display member of claim 9, wherein said bichromal balls have a diameter of about 70% to about 90% of the diameter of the capsules.

11. A display assembly comprising:
    a supporting substrate;
    a first addressing electrode disposed on said supporting substrate;
    a first adhesive layer disposed on said first electrode;
    a first monolayer of closely-packed encapsulated bichromal balls disposed on said first adhesive layer;
    a second monolayer of closely-packed bichromal balls disposed on said first monolayer of bichromal balls;
    a second adhesive layer disposed on said second monolayer of bichromal balls;
    a second addressing electrode disposed on said second adhesive layer; and
    a protective cover disposed on said second electrode and generally encapsulating the resulting assembly.

12. The display assembly of claim 11, wherein said substrate is electrically conductive and includes a material selected from the group consisting of copper, brass, nickel, zinc, chromium, stainless steel, conductive plastics, conductive rubbers, aluminum, semitransparent aluminum, steel, cadmium, silver, gold, indium, tin, metal oxides, and combinations thereof.

13. The display assembly of claim 11, wherein said substrate is electrically insulative and includes a material selected from the group consisting of paper, glass, plastics, and combinations thereof.

14. The display assembly of claim 11, wherein said adhesive is selected from the group consisting of copolymers of styrene and acrylate, polyester resins, copolymers of acrylonitrile and vinylidene chloride, polyvinyl acetate, polyvinyl butyral, polyolefins, cyanacrylates, silicone, epoxy and combinations thereof.

15. The display assembly of claim 11, wherein said substrate has a thickness of from about 25 microns to about 2000 microns, said adhesive layer has a thickness of from about 0.01 micron to about 20 microns, and said encapsulated bichromal balls have a diameter of from about 100 microns to about 150 microns.

16. A process for forming a layered array having a monolayer of closely-packed encapsulated bichromal balls, said process comprising:
    providing a substrate having an exposed adhesive surface;
    depositing a plurality of encapsulated bichromal balls on said exposed adhesive surface of said substrate such that a monolayer of encapsulated bichromal balls is formed by a cascading application process whereby each said encapsulated bichromal ball contacts said exposed adhesive face of said substrate and is thereby retained on said substrate, wherein the array exhibits a transmission optical contrast density of from about 0.40 to about 0.70.

17. The process of claim 16, further comprising:
    positioning said substrate at an inclined orientation.

18. The process of claim 16, wherein the depositing step is repeated a plurality of times to provide a substantially uniform monolayer.

19. The process of claim 17, wherein the amount of incident light that can transmit through the monolayer produced is 40% or less.

20. The process of claim 16, wherein during said depositing step, a portion of said encapsulated bichromal balls deposited on said substrate are not retained thereon and instead are collected in a container.

21. The process of claim 16, wherein during said depositing step, said substrate is moving.

22. The layered array produced according to the process of claim 16.

* * * * *